United States Patent
Bates et al.

(10) Patent No.: US 9,616,778 B1
(45) Date of Patent: Apr. 11, 2017

(54) VEHICLE SEAT STRUCTURE

(71) Applicant: Nissan North America, Inc., Franklin, TN (US)

(72) Inventors: Lisle Bates, Southfield, MI (US); Makoto Haraguchi, Northville, MI (US); Peihao Qi, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/953,784

(22) Filed: Nov. 30, 2015

(51) Int. Cl.
  *B60N 2/02* (2006.01)
  *B60N 2/14* (2006.01)

(52) U.S. Cl.
  CPC .................... *B60N 2/146* (2013.01)

(58) Field of Classification Search
  CPC ...................................................... B60N 2/146
  See application file for complete search history.

(56) References Cited

U.S. PATENT DOCUMENTS

| | | | |
|---|---|---|---|
| 4,475,763 A * | 10/1984 | Hamatani | B60N 2/3013 296/65.09 |
| 4,637,648 A * | 1/1987 | Okino | B60N 2/366 292/227 |
| 4,940,266 A * | 7/1990 | Sakamoto | B60N 2/366 292/227 |
| 5,498,052 A * | 3/1996 | Severini | B60N 2/305 296/65.09 |
| 7,195,302 B2 | 3/2007 | Jovicevic | |
| 7,270,371 B2 * | 9/2007 | Adragna | B60N 2/2209 296/65.09 |
| 7,611,200 B2 | 11/2009 | Jovicevic et al. | |
| 8,662,561 B2 * | 3/2014 | Runde | B60N 2/206 296/65.03 |

* cited by examiner

*Primary Examiner* — Lori L Lyjak
(74) *Attorney, Agent, or Firm* — Global IP Counselors, LLP

(57) ABSTRACT

A vehicle seat structure having a seat back section, a latch mechanism and a striker member. The latch mechanism is connected to the seat back section. The striker member has a first attachment end, a striker bar portion, a serpentine portion and a second attachment end. The striker bar portion is located between the first attachment end and the serpentine portion. The serpentine portion is located between the striker bar portion and the second attachment end. The first and second attachment ends are adapted to be attached to an upright rear wall of the passenger compartment. The striker bar portion is configured to releasably engage the latch mechanism to limit movement of the seat back section with respect to the rear wall of the passenger compartment. The serpentine portion is configured to deform in response to application of force to the seat back section in excess of a predetermined level of force.

20 Claims, 9 Drawing Sheets

VEHICLE SEAT STRUCTURE

BACKGROUND

Field of the Invention

The present invention generally relates to a vehicle seat structure. More specifically, the present invention relates to a vehicle seat structure having a seat back section with an upper region that attaches to a striker member fixed to an upright vehicle wall, the striker member being configured to undergo deformation in response to application of force above a predetermined level of force.

Background Information

In a truck structure, an upright portion of a rear seat structure (a seat back section) is often attached to upright portions of a vehicle body structure such that the upright portion is non-movable.

SUMMARY

One object of the disclosure is to provide a seat back section of a rear seat with an upright wall attachment structure that allows movement of the seat back section when a corresponding seat cushion section is moved between an in-use position and a stowed position such that the upright wall attachment structure allows a predetermined range of vertical movement of the seat back section.

Another object of the disclosure is to provide the seat back section of the rear seat in the truck with an attachment structure that allows deformation of the attachment structure in response to application of force to the seat back section above a predetermined level of force.

In view of the state of the known technology, one aspect of the present disclosure is to provide a vehicle seat structure with a seat back section, a latch mechanism and a striker member. The latch mechanism is connected to the seat back section. The striker member has a first attachment end, a striker bar portion, a serpentine portion and a second attachment end. The striker bar portion is located between the first attachment end and the serpentine portion. The serpentine portion is located between the striker bar portion and the second attachment end. The first and second attachment ends are adapted to be attached to an upright rear wall of the passenger compartment. The striker bar portion is configured to releasably engage the latch mechanism to limit movement of the seat back section with respect to the rear wall of the passenger compartment. The serpentine portion is configured to deform in response to application of force above a predetermined level of force.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
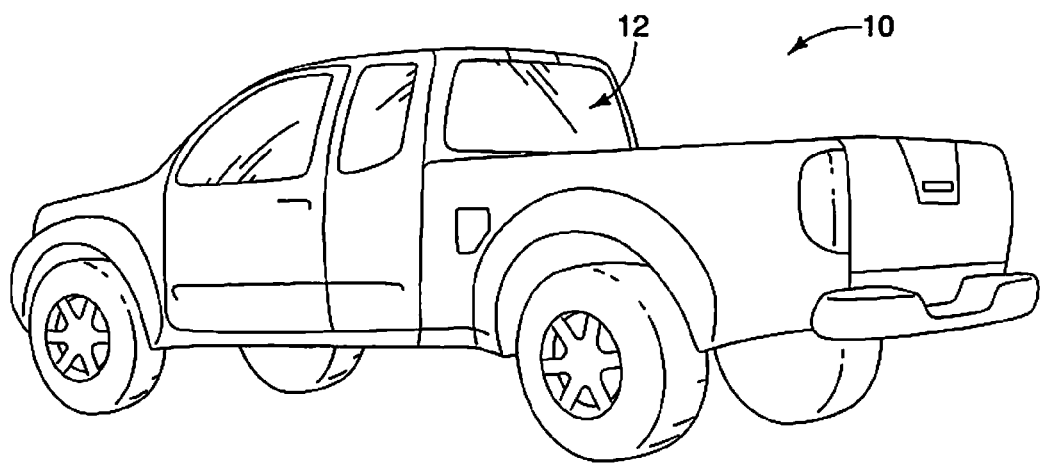
FIG. 1 is a perspective view of a vehicle having a passenger compartment that includes front seats and rear seats in accordance with a first embodiment.
Figure 2:
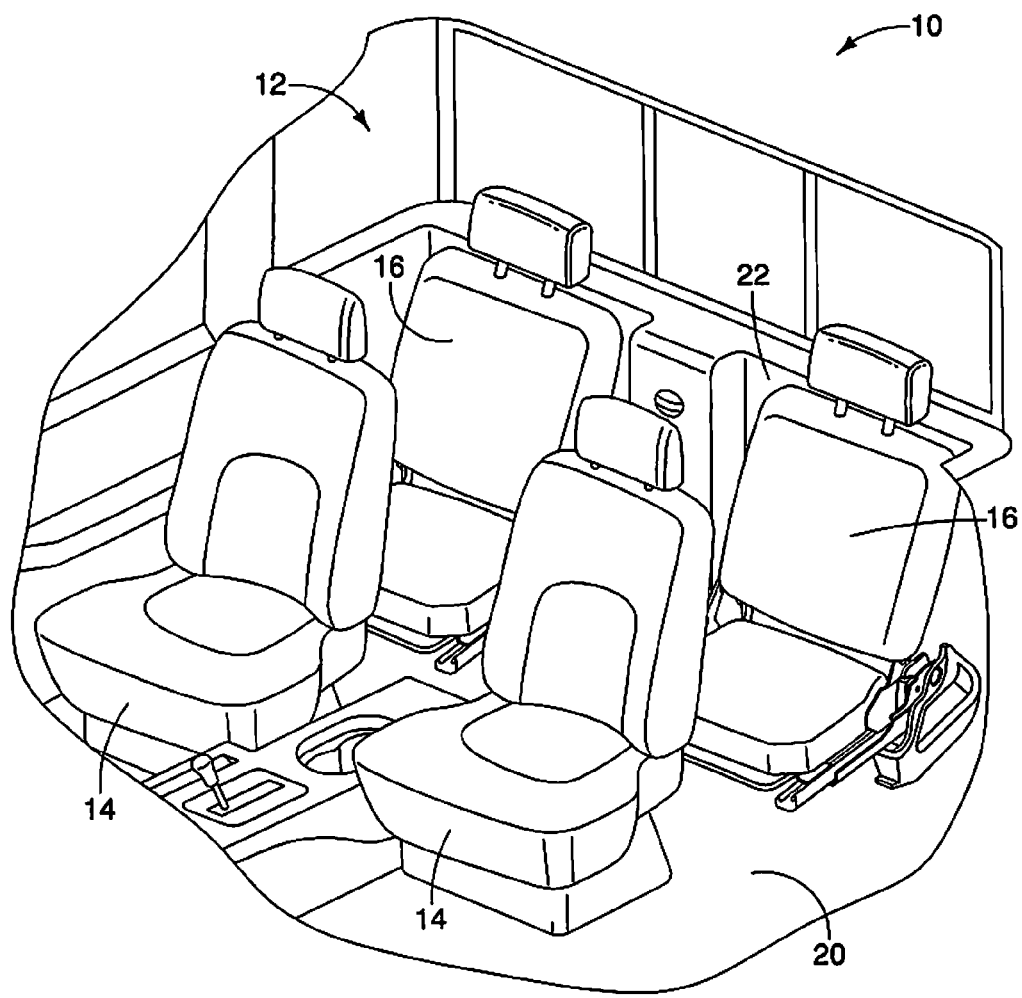
FIG. 2 is a perspective view of the passenger compartment of the vehicle depicted in FIG. 1 showing the front seats and the rear seats in accordance with the first embodiment.

Referring initially to FIG. 1, a vehicle 10 having a passenger compartment 12 is illustrated in accordance with a first embodiment. As shown in FIG. 2, the passenger compartment 12 of the vehicle 10 includes front seats 14 and rear seats 16. As is described in greater detail below, the rear seats 16 are attached to both a floor 20 and a rear wall 22 of the passenger compartment 12. The rear wall 22 includes a striker member 24 (see FIGS. 3 and 4) that is described in greater detail below.

In the depicted embodiment, the vehicle 10 is a pickup truck that includes sufficient space within the passenger compartment 12 for both the front seats 14 and the rear seats 16. However, the rear seat 16 and striker member 24 described herein below can be used in any of a variety of vehicle structures where a seat structure is supported by or attaches to a rear wall of a passenger compartment and is not limited to use only in a pickup truck structure.

Figure 3:
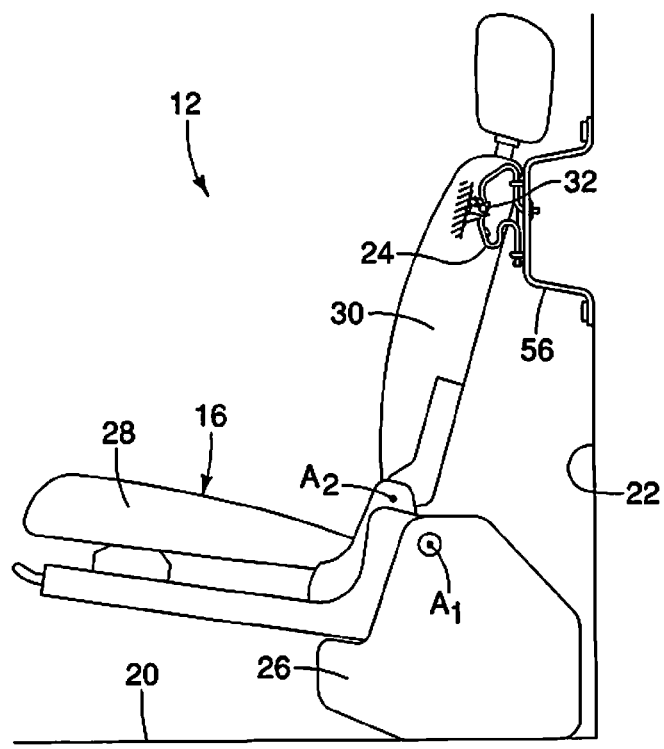
FIG. 3 is a side view of a portion of the passenger compartment showing a floor, a rear wall and a rear seat that includes a seat cushion section pivotally supported to the floor and a seat back section having a lower region pivotally supported to the seat cushion section and a latch mechanism at an upper region of the seat back section that is releaseably attached to a striker member fixed to the rear wall, with the seat cushion section and the seat back section in an in-use position in accordance with the first embodiment.
Figure 4:
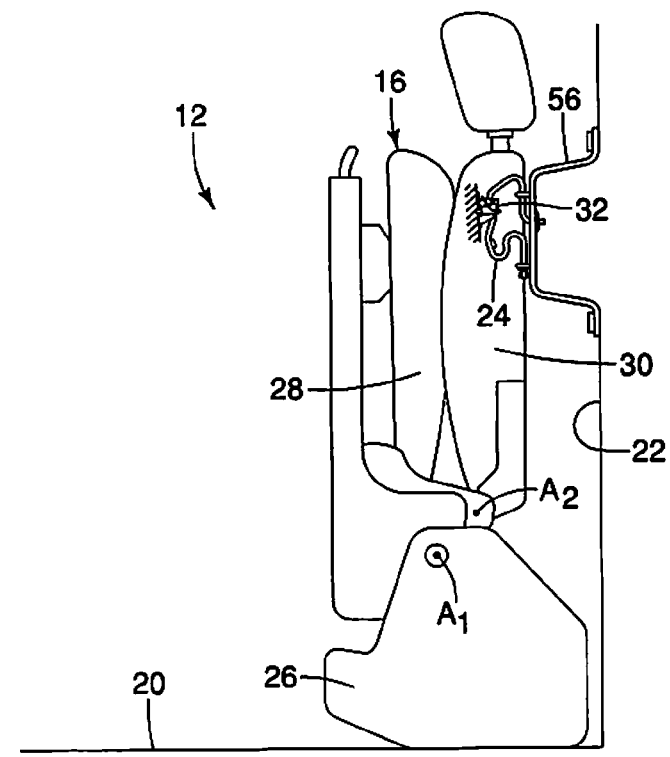
FIG. 4 is another side view of the portion of the passenger compartment similar to FIG. 3 showing the seat cushion section and the seat back section in a stowed position in accordance with the first embodiment.
Figure 5:
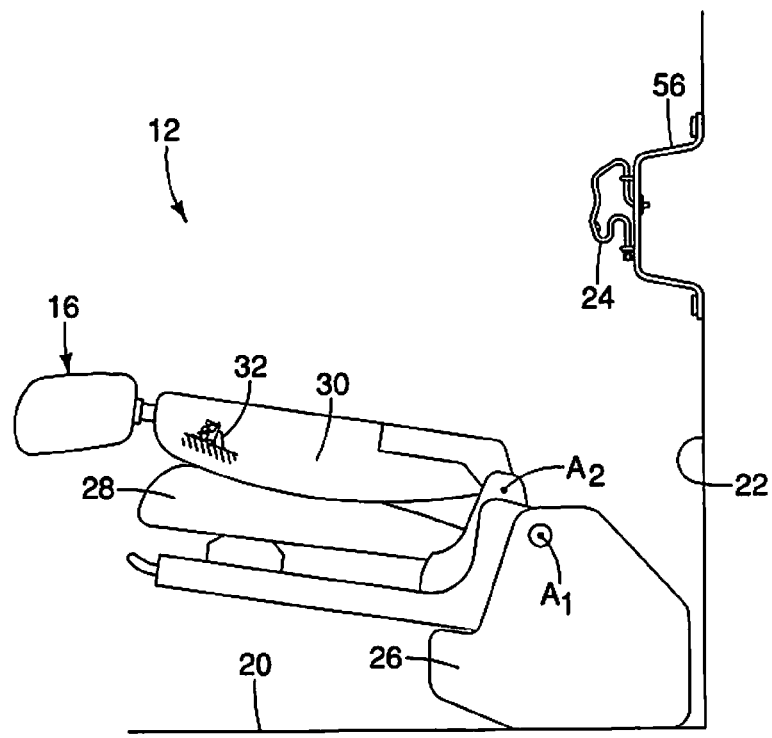
FIG. 5 is still another side view of the portion of the passenger compartment similar to FIGS. 3 and 4 showing the latch mechanism of the seat back section released from the rear wall and pivoted to a cargo receiving position in accordance with the first embodiment.

As shown in FIGS. 3, 4 and 5, each of the rear seats 16 includes a base 26, a seat cushion section 28 and a seat back section 30. Since the rear seats 16 are basically identical, description of one applies equally to both. Hence, only one of the rear seats 16 is described herein for the sake of brevity.

The base 26 of the rear seat 16 is rigidly attached to the floor 20 via, for example, mechanical fasteners (not shown). However, the base 26 can alternatively be fixedly attached to the rear wall 22. The seat cushion section 28 is pivotally mounted to the base 26 for movement between an in-use position (FIG. 3) and a stowed position (FIG. 4). The seat cushion section 28 pivots relative to the base 26 about a first pivot axis $A_1$. The seat back section 30 is pivotally mounted to the seat cushion section 28 for movement about a second pivot axis $A_2$ that is spaced apart from the first pivot axis $A_1$.

An upper rear portion of the seat back section 30 includes a latch mechanism 32 that is fixedly attached to the seat back section 30. The latch mechanism 32 is configured to releasably engage the striker member 24, as is described in greater detail below.

Since the second pivot axis $A_2$ and the first pivot axis $A_1$ are spaced apart from one another, the seat back section 30 also moves in response to the seat cushion section 28 moving between the in-use position (FIG. 3) to the stowed position (FIG. 4). In the in-use position (FIG. 3) the seat back section 30 is slightly inclined (an inclined orientation) with respect to vertical for the sake of passenger comfort. As the seat cushion section 28 moves from the in-use position (FIG. 3) to the stowed position (FIG. 4) the seat back section 30 moves upward slightly in response to movement of the second pivot axis $A_2$. Further, the seat back section 30 moves from the inclined orientation (FIG. 3) to a generally vertical orientation (FIG. 4). In the stowed position (FIG. 4) since the seat back section 30 is in the vertical orientation, the seat cushion section 28 can also be generally vertically oriented in order to maximize cargo space behind the front seats 14.

The seat back section 30 is also able to move independently of the seat cushion section 28 between the in-use position (FIG. 3) and a cargo receiving position (FIG. 5). Prior to movement of the seat back section 30 from the in-use position (FIG. 3) to the cargo receiving position (FIG. 5), the latch mechanism 32 must be released from the striker member 24. The latch mechanism 32 is provided with a release member 34 attached to the latch mechanism 32 that releases the latch mechanism 32 from the striker member 24.

The release member 34 can be a strap connected to the latch mechanism 32, or can be a lever (not shown) attached to the latch mechanism 32.

Figure 7:
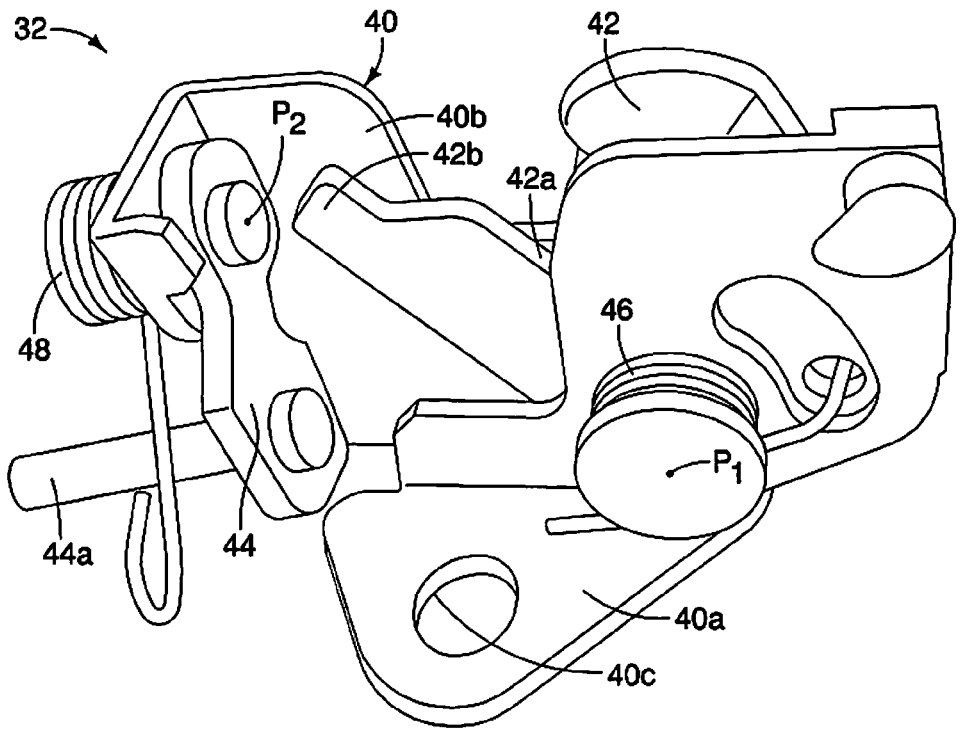
FIG. 7 is a perspective view of the latch mechanism removed from the seat back section showing the latch mechanism in a release orientation in accordance with the first embodiment.
Figure 8:
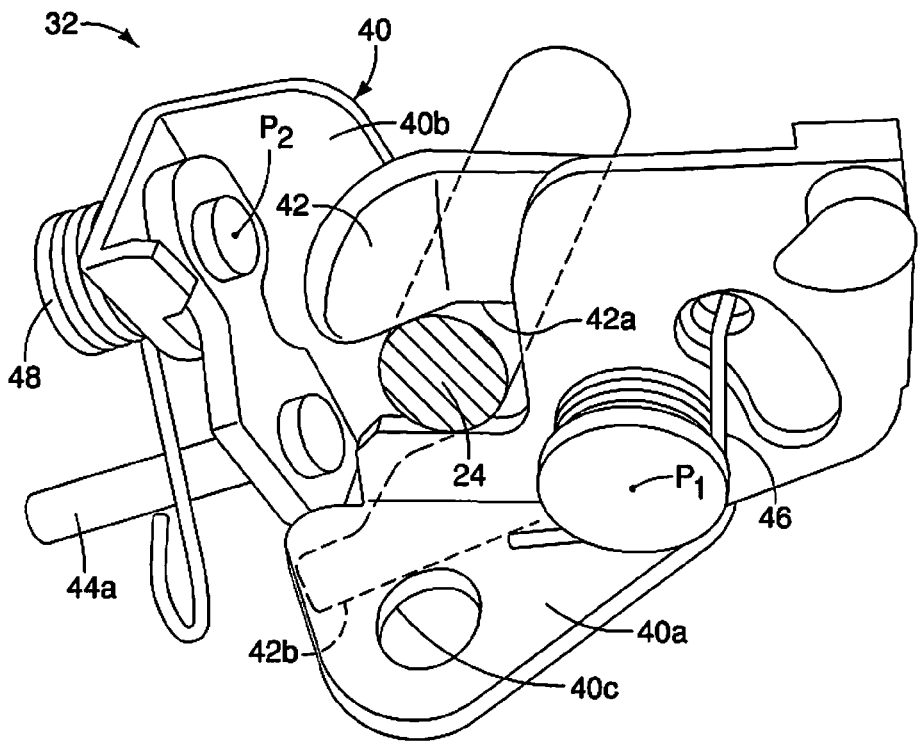
FIG. 8 is another perspective view of the latch mechanism similar to FIG. 7 showing the latch mechanism in a locked orientation where the latch mechanism is locked to the striker member in accordance with the first embodiment.

A description of the latch mechanism 32 is now provided with specific reference to FIGS. 7 and 8. FIG. 7 shows the latch mechanism 32 in a released orientation, and FIG. 8 shows the latch mechanism 32 in a locked orientation locked to the striker member 24. In the locked orientation (FIG. 8) the latch mechanism 32 secures the seat back section 30 to the striker member 24 and the rear wall 22, as depicted in FIG. 3. In the released orientation, the latch mechanism 32 releases the striker member 24 and allows movement of the seat back section 30 to the cargo receiving position shown in FIG. 5.

The latch mechanism 32 basically includes a base 40, a catch 42, a release bracket 44, a first biasing member 46 and a second biasing member 48. The base 40 includes a securing section 40a and a support flange 40b. The securing section 40a and the support flange 40 are made integrally as a single element. The securing section 40a includes apertures 40c (only one aperture is shown in FIGS. 7 and 8) for fastening the latch mechanism 32 directly to the seat back section 30 in a conventional manner via, for example, mechanical fasteners (not shown). The catch 42 (also referred to as a striker engagement plate) is pivotally supported to the base 40 via a pivot pin $P_1$ and is biased to the released orientation shown in FIG. 7 by the first biasing member 46. The catch 42 includes a recessed area 42a that is dimensioned to receive the striker member 24 and a lock projection 42b, described further below.

Figure 6:
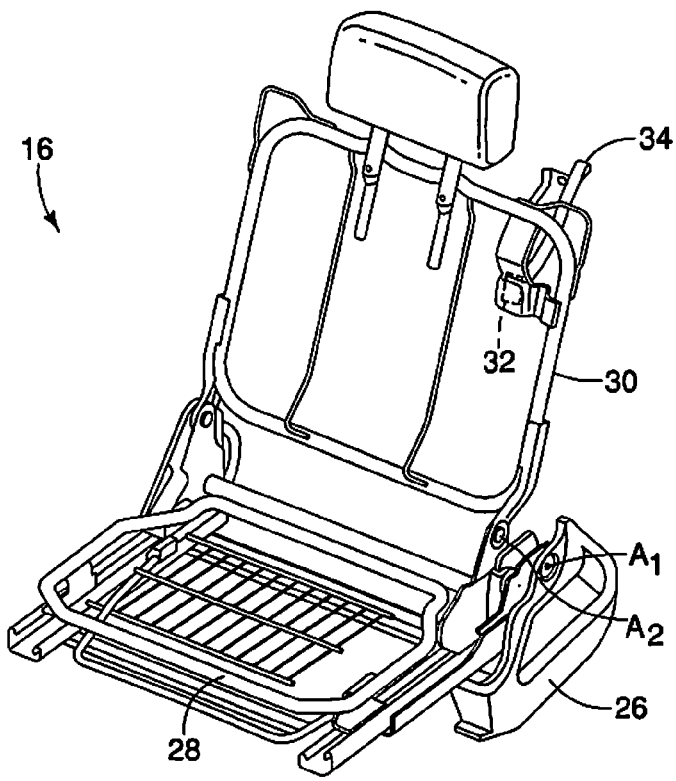
FIG. 6 is a perspective view of the rear seat with cushion and cover material removed showing frame structure along with the latch mechanism and a release member in accordance with the first embodiment.

The release bracket 44 is supported for pivotal movement on the support flange 40b via a pivot pin $P_2$. The release bracket 44 is biased to the locked orientation shown in FIG. 8 by the second biasing member 48. The release bracket 44 also includes a pin 44a that is attached to the release member 34, as indicated in FIG. 6.

In order to put the latch mechanism 32 in the locked orientation, the seat back section 30 is lifted from the cargo receiving position shown in FIG. 5 to the in-use position shown in FIG. 3 where the striker member 24 is pushed against the surfaces of the recessed area 42a of the catch 42. The force of the first biasing member 46 is overcome by movement of the latch mechanism 32 against the striker member 24 causing the catch 42 to pivot. Continued movement of the catch 42 causes the lock projection 42b to move relative to the release bracket 44. Once the lock projection 42b is moved below the release bracket 44 (relative to the orientation shown in FIGS. 7 and 8) the biasing force of the second biasing member 48 causes the release bracket 44 to move toward the support flange 40b, preventing movement of the catch 42.

To release the seat back section 30, the release member 34 is pulled, causing movement of the pin 44a and the release bracket 44 against the force of the second biasing member 48. Once the release bracket 44 has pivoted away from the lock projection 42b of the catch 42, the catch 42 moves to the released orientation shown in FIG. 7 due to the biasing force of the first biasing member 46.

Figure 9:
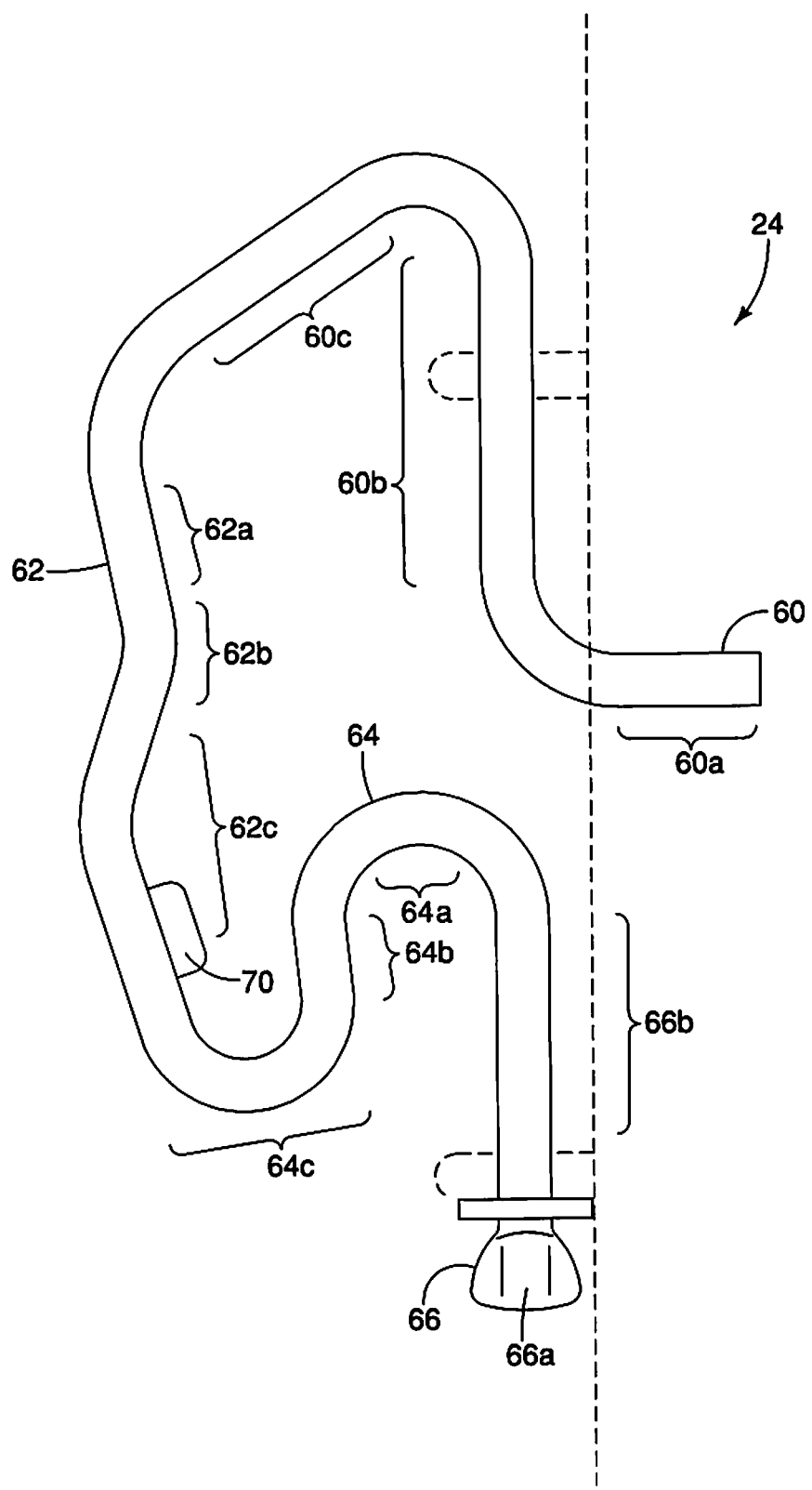
FIG. 9 is a side view of the striker member shown removed from the rear wall of the passenger compartment in accordance with the first embodiment.

A description of the striker member 24 is now provided with initial reference to FIG. 9. The striker member 24 is preferably made of a metallic material that has a predetermined level of strength, but is not necessary hardened. As is described below, it is preferable that the striker member 24 can undergo a predetermined amount of deformation when subjected to sufficient force. In other words, the material used to form the striker member 24 should be capable of deformation. In FIG. 9, the striker member 24 is shown removed from a bracket 56 that secures the striker member 24 to the rear wall 22. Rather, the bracket 56 is merely indicated in phantom lines in FIG. 9.

The striker member 24 includes a first attachment end 60, a striker bar portion 62, a serpentine portion 64 and a second attachment end 66. The striker bar portion 62 is located between the first attachment end 60 and the serpentine portion 64. The serpentine portion 64 is located between the striker bar portion 62 and the second attachment end 66. The first and second attachment ends 60 and 66 are adapted to be attached to the rear wall 22 of the passenger compartment 12 via the bracket 56. The striker bar portion 62 is configured to releasably engage the latch mechanism 32 in order to limit movement of the seat back section 30 with respect to the rear wall 22 of the passenger compartment 12. As is described in greater detail below, the serpentine portion 64 is configured to deform in response to application of force on the seat back section 30 above a predetermined level of force.

In the depicted embodiment, the first attachment end 60 is located above the second attachment end 66.

The first attachment end 60 includes a first region 60a, a second region 60b and a third region 60c. The first region 60a is provided for insertion into an aperture in the bracket 56 to maintain vertical positioning of the striker member 24 relative to the rear wall 22. The second region 60b extends upward from and perpendicular to the first region 60a with a curved region therebetween. The third region 60c is inclined downward extending away from an upper end of the second region 60b. The third region 60c and the upright second region 60b define an angle of between 50 and 60 degrees therebetween, with a curved region therebetween. One purpose of the third region 60c is to provide sufficient spacing between the striker bar portion 62 and the second region 60b of the first attachment end 60.

The striker bar portion 62 extends downward from the third region 60c and includes an upper region 62a, a central region 62b and a lower region 62c. The striker bar portion 62 is curved, with the central region 62b being closer to the bracket 56 than the upper region 62a and the lower region 62c. As is described in greater detail below, the curvature of the striker bar portion 62 is provided to accommodate movement of the latch mechanism 32 as the seat back section 32 moves between the in-use position (FIG. 3) and the stowed position (FIG. 4).

As shown in FIG. 9, the serpentine portion 64 has an overall S-shape (with the S turned on its side relative to the depiction in FIG. 9). The serpentine portion 64 defines an upper section 64a, a mid-section 64b and a lower section 64c. The upper section 64a extends from the second attachment end 66 and curves downward therefrom. The lower section 64c extends from the lower region 62c of the striker bar portion 62 and curves upward therefrom. The mid-section 64b extends from the lower section 64c to the upper section 64a. The upper region 62a, the central region 62b and the lower region 62c define the S-shape.

The second attachment end 66 includes a crimped distal end 66a, and an extending region 66b that extends from the distal end 66a to the upper region 62a of the serpentine portion 64 of the striker member 24. The extending region 66b is configured to attach to the bracket 56.

As shown in FIG. 9, the lower region 64c (lower section) of the serpentine portion 64 is located above the distal end 66a of the second attachment end 66. Further, the upper section 64a of the serpentine portion 64 is located above the lower end 62c of the striker bar portion 62.

The striker member 24 further includes a stop projection 70 located proximate the lower end of the lower region 62c of striker bar portion 62. The stop projection 70 is positioned such that with the latch mechanism 32 engaged with the striker member 24, the catch 42 (also referred to as the striker engagement plate) contacts the stop projection 70 in response to application of force to the seat back section 30 greater than a predetermined level of force. More specifically, the stop projection 70 prevents the catch 42 (the striker engagement plate) and the latch mechanism 32 from moving downward to the serpentine portion 64 of the striker member 24. In other words, the stop projection 70 serves to maintain the connection between the latch mechanism 32 and the striker member 24 within the striker bar portion 62 of the striker member 24.

Figure 10:
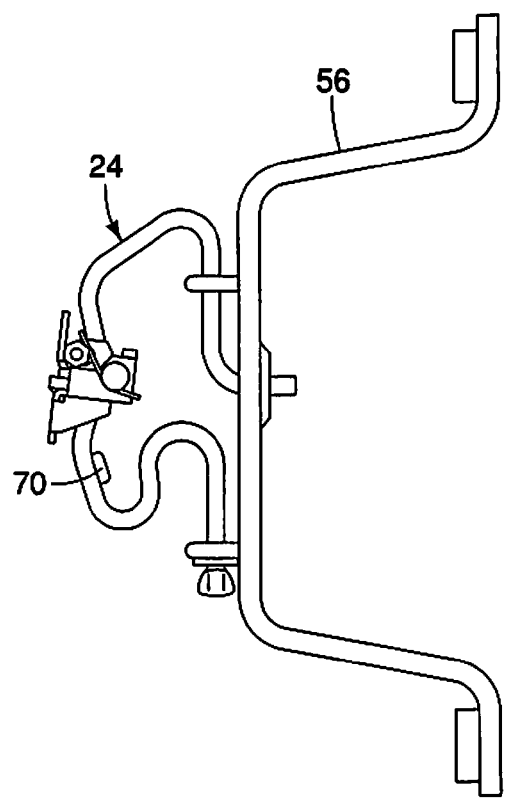
FIG. 10 is a side view of the striker member attached to a bracket that attaches the rear wall of the passenger compartment showing the latch mechanism in a position corresponding to the seat cushion section being in the in-use position shown in FIG. 3 in accordance with the first embodiment.
Figure 11:
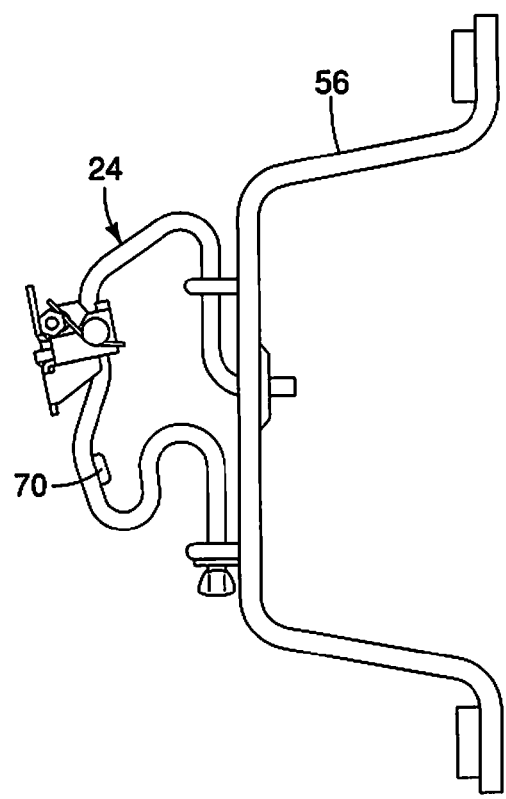
FIG. 11 is another side view of the striker member similar to FIG. 10 showing the latch mechanism in a position corresponding to the seat cushion section being in the stowed position shown in FIG. 4 in accordance with the first embodiment.

Hence as shown in FIGS. 10 and 11, the latch mechanism 32 is configured to releasably engage the striker bar portion 62 of the striker member 24 such that the latch mechanism 32 is able to move in vertical directions in response to movement of the seat cushion section 28 and the seat back section 30 between the in-use position (FIG. 10) and the stowed position (FIG. 11). Specifically, the latch mechanism 32 slides upward along the striker member 24 as the seat back section 30 moves from the in-use position (FIG. 10) to the stowed position (FIG. 11).

Figure 12:
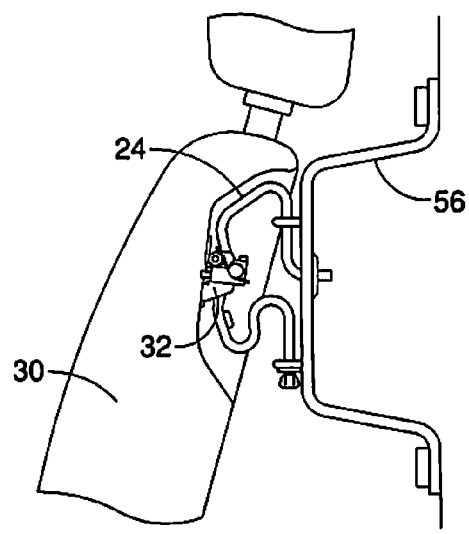
FIG. 12 is a side view of the seat cushion section, the latch mechanism and the striker member shown in the in-use position in accordance with the first embodiment.
Figure 13:
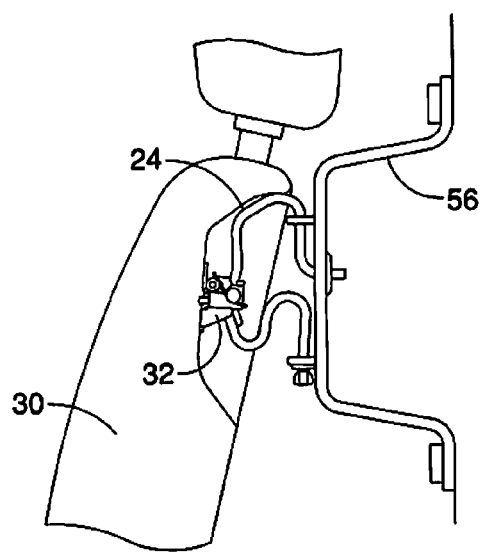
FIG. 13 is another side view of the seat cushion section, the latch mechanism and the striker member similar to FIG. 12 showing the seat cushion section during an event where the seat cushion section is moved forward relative to the rear wall due to application of force greater than a predetermined level of force with the striker member responding by undergoing a first stage of deformation in accordance with the first embodiment.
Figure 14:
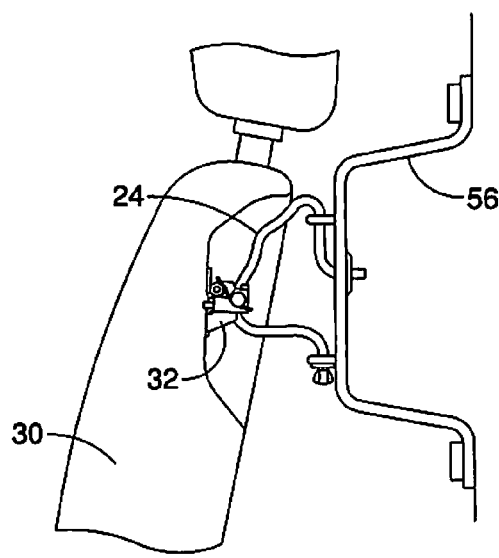
FIG. 14 is another side view of the seat cushion section, the latch mechanism and the striker member similar to FIG. 13 showing the seat cushion section at the completion of an event where force greater than the predetermined level of force has been applied to the seat cushion showing the striker member in a further deformed state in accordance with the first embodiment.

However as shown in FIGS. 12 13 and 14, during an event where force applied to the seat back section 30 exceeds a predetermined level of force deformation of structures such as the striker member 24 can occur. In this case, the stop projection 70 limits movement of the latch mechanism 32 in a downward direction relative to the striker member 24. In FIG. 12, the seat back section 30 is in the in-use position with the latch mechanism 32 engaged with the striker member 24. In FIG. 13, an event is in progress and the mass of a person or cargo (not shown) in the rear seat 16 or force otherwise applied to the rear seat 16 is sufficient to cause the latch mechanism 32 to begin deforming the striker member 24. A comparison of the shape of the striker member 24 in FIG. 12 and the shape of the striker member 24 in FIG. 13 demonstrates one possible deformation stage during an event where force exceeding a predetermined level of force is applied. FIG. 14 shows the seat cushion section 30 at the completion of the event showing the striker member 24 in a further deformed state due to abnormal application of force or rapid changes in inertia. As is clear in FIG. 14, a majority of the deformation of the striker member 24 has occurred in the serpentine portion 64. Specifically, the S-shape of the serpentine portion 64 has been distorted and elongated. The deformation of the serpentine portion 64 of the striker member 24 is due to the S-shape, but is also aided by the inclusion of the stop projection 70, which limits movement of the latch mechanism 32 downward into the serpentine portion 64. The forces causing deformation of the striker member 24 are directed to the portion of the striker member 24 proximate the stop projection 70, which assists in directing the deformation to the serpentine portion 64. The predetermined level of force mentioned above is preferably a level of force that occurs during normal usage of the vehicle 10. Forces applied to the seat back section 30 that exceed this predetermined level of force can include, for example, forces that pull the seat back section 30 away from the rear wall 22 that far exceed the normal usage forces. For example, an event that applies abnormal forces on the rear seats 16 can include testing of structures of the vehicle 10 where the abnormal forces exceed a predetermined level of force. Another event could be, for example, an impact event where cargo or a person is seated in one of the rear seats 16 can apply abnormal force due to rapid changes in acceleration.

In the first embodiment, the stop projection 70 is formed on the striker member 24 by crimping, squeezing and/or otherwise deforming a lower end of the lower region 62c of the striker bar portion 62. As mentioned above, the striker member 24 is preferably made of a metallic material that has a predetermined level of strength, but is not necessary hardened. The striker member 24 is designed to be capable of deformation during an event where abnormal forces exceeding the predetermined level of force are applied to the rear seats 16.

It should be understood from the drawings and the description herein that the stop projection 70 can be made or formed on the striker member 24 in any of a variety of ways, as is demonstrated in the accompanying alternative embodiments.

Second Embodiment

Figure 15:
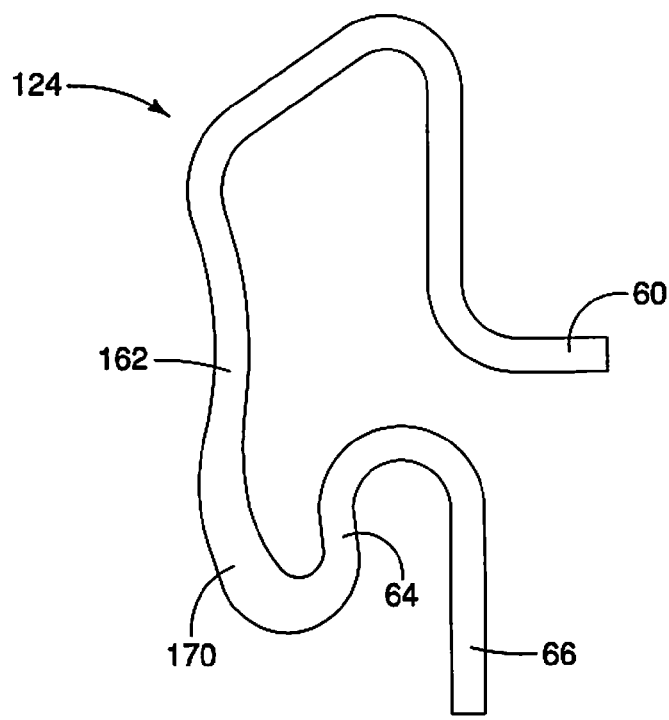
FIG. 15 is a side view of a striker member in accordance with a second embodiment.

Referring now to FIG. 15, a striker member 124 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the striker member 124 includes the first attachment end 60, the serpentine portion 64 and the second attachment end 66, as described above with respect to the first embodiment. However, in the second embodiment, the striker member 124 is formed with a striker bar portion 162 that includes an area with an enlarged diameter that defines a stop projection 170 that serves the same purpose and function as the stop projection 70 of the first embodiment.

Third Embodiment

Figure 16:
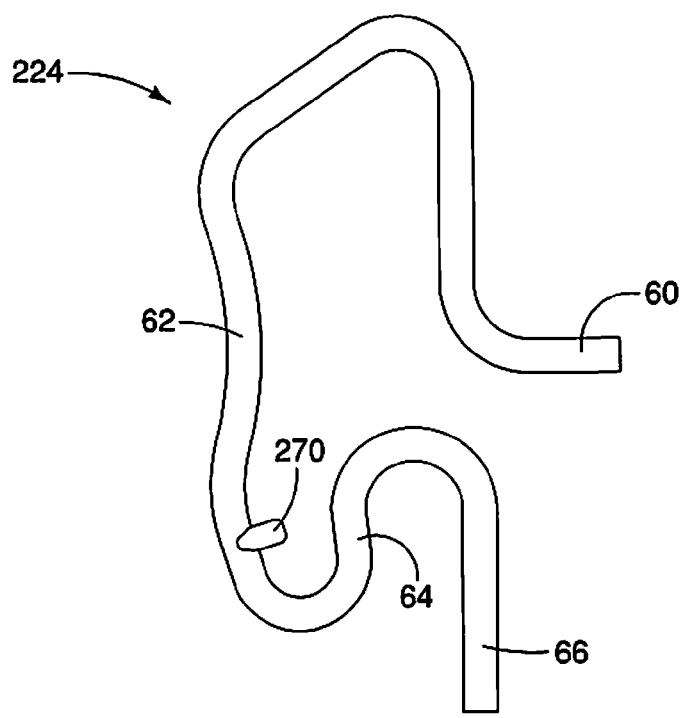
FIG. 16 is a side view of a striker member in accordance with a third embodiment.
Figure 17:
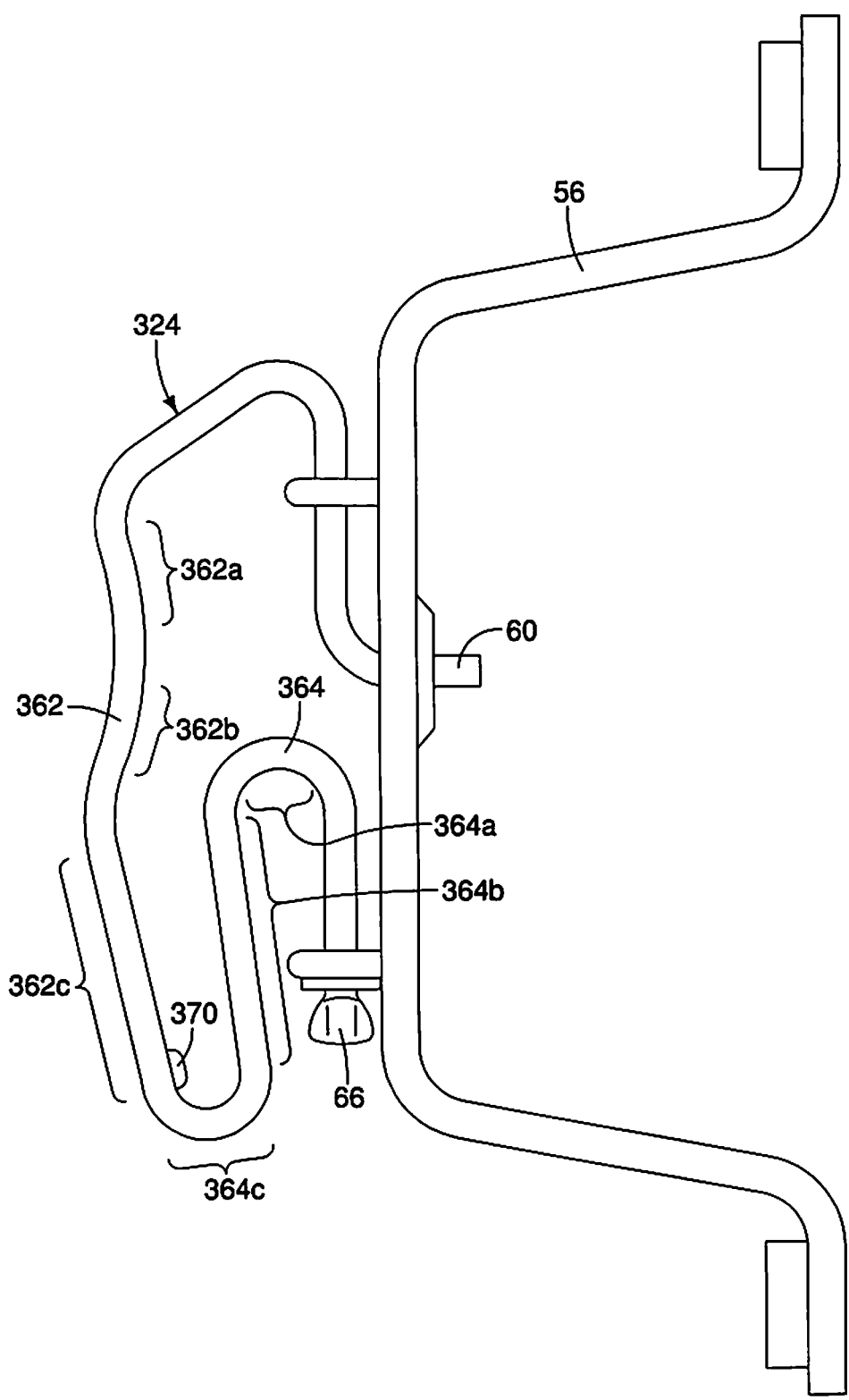
FIG. 17 is a side view of a striker member in accordance with a fourth embodiment.

Referring now to FIG. 16, a striker member 224 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the striker member 224 includes the first attachment end 60, the striker bar portion 62, the serpentine portion 64 and the second attachment end 66, as described above with respect to the first embodiment. However, in the third embodiment, the stop projection 70 is replaced with a stop projection 270 that serves the same purpose and function as the stop projection 70 of the first embodiment. However, the stop projection 270 is formed using any of a variety of welding techniques. Specifically, a metallic element, such as a washer, nut or small metallic block can be welded to the lower end of the striker bar portion 62. The welding material and the metallic element protrude from the lower end of the striker bar portion 62 thereby defining the stop projection 270. Alternatively, welding material can be built up (via welding techniques) at the lower end of the striker bar portion 62 in order to define the stop projection 270.

Fourth Embodiment

Referring now to FIG. 16, a striker member 324 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the striker member 324 includes the first attachment end 60 and the second attachment end 66, as described above with respect to the first embodiment. However, in the fourth embodiment, a striker bar portion 362 and a serpentine portion 364 are included in place of the striker bar portion 62 and the serpentine portion 64 of the first embodiment. The striker bar portion 362 includes an upper region 362a, a central region 362b and a lower region 362c. The upper region 362a and the central region 362b are dimensioned in a manner that is similar to the upper region 62a and the central region 62b of the first embodiment. However, the lower region 362c is elongated as comparted to the lower region 62c of the first embodiment.

Further, each section of the serpentine portion 364 of the fourth embodiment is also elongated as compared to corresponding sections of the serpentine portion 64 of the first embodiment. Specifically, the serpentine portion 364 includes an upper section 364a, a mid-section 364b and a lower section 364c. The upper section 364a is similar to the upper section 64a of the first embodiment, but the mid-section 364b and the lower section 364c are elongated as compared to the first embodiment. The mid-section 364b extends below the second attachment end 66. The lower section 364c then curves 180 degrees to connect to the lower section 362c. The mid-section 364b of the serpentine portion 364 and the lower section 362c of the striker bar portion 362 are several times longer than their counterparts in the first embodiment.

The elongated dimensions of the mid-section 364b of the serpentine portion 364 and the lower section 362c of the striker bar portion 362 provide the striker member 324 with capability to deform to a greater degree that the striker member 24 of the first embodiment in response to an event where abnormal forces are applied to the rear seats 16.

It should be understood that the overall dimensions of the various portions and section of the striker members 24, 124, 224 and 324 can be modified to fit specific deformation criteria thereby providing the vehicle 10 with improved responses to events where abnormal forces are applied to the rear seats 16 while maintaining the rear seat 16 in an upright in-use position.

The various features of a passenger compartment of a vehicle are conventional components that are well known in the art. Since passenger compartment elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seat structure. Accordingly, these terms, as utilized to describe the present invention should be interpreted relative to a vehicle equipped with the vehicle seat structure.

The term "configured" as used herein to describe a component, section or part of a device that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seat structure comprising:
   a seat back section;
   a latch mechanism connected to the seat back section; and
   a striker member having a first attachment end, a striker bar portion, a serpentine portion and a second attachment end, the striker bar portion being located between the first attachment end and the serpentine portion, the serpentine portion being located between the striker bar portion and the second attachment end, the first and second attachment ends being adapted to be attached to an upright rear wall of the passenger compartment, the striker bar portion being configured to releasably engage the latch mechanism to limit movement of the seat back section with respect to the rear wall of the passenger compartment and the serpentine portion being configured to deform in response to application of force to the seat back section that exceeds a predetermined level of force.

2. The vehicle seat structure of claim 1, wherein the serpentine portion has an overall S-shape.

3. The vehicle seat structure of claim 1, wherein the first attachment end is located above the second attachment end, the serpentine portion defines an upper section, a mid-section and a lower section, the upper section extending from the second attachment end and curving downward therefrom, the lower section extending from a lower end of the striker bar portion and curving upward therefrom with the mid-section extending from the lower section to the upper section.

4. The vehicle seat structure of claim 3, wherein the lower section of the serpentine portion is located above a distal end of the second attachment end.

5. The vehicle seat structure of claim 3, wherein the upper section of the serpentine portion is located above the lower end of the striker bar portion.

6. The vehicle seat structure of claim 3, wherein the latch mechanism includes a striker engagement plate that at least partially encircles the striker bar portion with the latch mechanism engaged with the striker member.

7. The vehicle seat structure of claim 6, wherein the striker member includes a stop projection located proximate the lower end of striker bar portion, the stop projection being position such that with the latch mechanism engaged with the striker member, the striker engagement plate contacts the stop projection in response to application of force to the seat back section in excess of a predetermined level of force preventing movement of the striker engagement plate to the serpentine portion of the striker member.

8. The vehicle seat structure of claim 1, wherein the latch mechanism includes a striker engagement plate that at least partially encircles the striker bar portion with the latch mechanism engaged with the striker member.

9. The vehicle seat structure of claim 8, wherein the striker member includes a stop projection located proximate a lower end of striker bar portion, the stop projection being positioned such that with the latch mechanism engaged with the striker member, the striker engagement plate contacts the stop projection in response to movement of the seat back section during an event where forces are applied to the striker member that exceed the predetermined level of force preventing movement of the striker engagement plate to the serpentine portion of the striker member.

10. The vehicle seat structure of claim 1, further comprising
a seat cushion section that is mounted for movement between an in-use position and a stowed position, with the seat back section being pivotally mounted to the seat cushion section for movement therewith, and
the latch mechanism is configured to releasably engage the striker bar portion such that the latch mechanism moves in vertical directions in response to movement of the seat cushion section and the seat back section between the in-use and stowed position.

11. The vehicle seat structure of claim 10, wherein the latch mechanism moves downward with respect to the striker member as the seat cushion section and the seat back section move from the stowed position to the in-use position.

12. The vehicle seat structure of claim 1, wherein the striker member includes a stop projection located proximate a lower end of striker bar portion.

13. The vehicle seat structure of claim 12, wherein the stop projection is defined by a deformed area of the lower end of the striker bar portion.

14. The vehicle seat structure of claim 12, wherein
the stop projection is defined by a metallic element welded to the lower end of the striker bar portion.

15. A vehicle seat structure comprising:
a seat back section;
a latch mechanism connected to the seat back section; and
a striker member having a first attachment end, a striker bar portion, a serpentine portion and a second attachment end, the striker bar portion being located between the first attachment end and the serpentine portion, the serpentine portion being located between the striker bar portion and the second attachment end, the first and second attachment ends being adapted to be attached to a rear wall of the passenger compartment such that the first attachment end is located above the second attachment end, the striker bar portion being configured to releasably engage the latch mechanism to limit movement of the seat back section with respect to the rear wall of the passenger compartment, and
the serpentine portion defining an upper section, a mid-section and a lower section, the upper section extending from the second attachment end and curving downward therefrom, the lower section extending from a lower end of the striker bar portion and curving upward therefrom with the mid-section extending from the lower section to the upper section.

16. The vehicle seat structure of claim 15, wherein
the serpentine portion has an overall S-shape.

17. The vehicle seat structure of claim 15, wherein
the serpentine portion is configured to deform in response to application of force to the seat back section that exceeds a predetermined level of force.

18. The vehicle seat structure of claim 15, wherein
the lower section of the serpentine portion is located above a distal end of the second attachment end, and
the upper section of the serpentine portion is located above the lower end of the striker bar portion.

19. The vehicle seat structure of claim 15, wherein
the striker member includes a stop projection located proximate the lower end of striker bar portion, the stop projection being defined by a deformed portion of the lower end of the striker bar portion.

20. The vehicle seat structure of claim 15, wherein
the striker member includes a stop projection located proximate the lower end of striker bar portion, the stop projection being defined by a metallic element welded to the lower end of the striker bar portion.

* * * * *